US008891629B2

(12) United States Patent
Endresen

(10) Patent No.: US 8,891,629 B2
(45) Date of Patent: Nov. 18, 2014

(54) FILTER PROCESS IN COMPRESSION/DECOMPRESSION OF DIGITAL VIDEO SYSTEMS

(75) Inventor: Lars Petter Endresen, Nesoddtangen (NO)

(73) Assignee: Cisco Technology, Inc., San Jose, CA (US)

(*) Notice: Subject to any disclaimer, the term of this patent is extended or adjusted under 35 U.S.C. 154(b) by 319 days.

(21) Appl. No.: 12/642,370

(22) Filed: Dec. 18, 2009

(65) Prior Publication Data

US 2010/0158124 A1  Jun. 24, 2010

Related U.S. Application Data

(60) Provisional application No. 61/142,287, filed on Jan. 2, 2009.

(30) Foreign Application Priority Data

Dec. 19, 2008 (NO) .................................. 20085334

(51) Int. Cl.
| | |
|---|---|
| *H04N 11/04* | (2006.01) |
| *H04N 11/02* | (2006.01) |
| *G06K 9/32* | (2006.01) |
| *G06F 13/00* | (2006.01) |
| *H04N 19/61* | (2014.01) |
| *H04N 19/59* | (2014.01) |
| *H04N 19/80* | (2014.01) |

(52) U.S. Cl.
CPC ... *H04N 19/00757* (2013.01); *H04N 19/00781* (2013.01); *H04N 19/0089* (2013.01)
USPC ................. 375/240.17; 375/240.16; 382/300; 711/154

(58) Field of Classification Search
None
See application file for complete search history.

(56) References Cited

U.S. PATENT DOCUMENTS

| 6,476,824 | B1* | 11/2002 | Suzuki et al. ................. 345/690 |
|---|---|---|---|
| 7,589,781 | B2* | 9/2009 | Huang ........................... 348/355 |
| 2002/0101417 | A1 | 8/2002 | Burk et al. |
| 2003/0063093 | A1* | 4/2003 | Howard et al. ............... 345/581 |
| 2003/0218614 | A1 | 11/2003 | Lavelle et al. |
| 2004/0150747 | A1* | 8/2004 | Sita ............................... 348/558 |
| 2005/0123040 | A1* | 6/2005 | Bjontegard ............. 375/240.12 |
| 2005/0128357 | A1* | 6/2005 | Kim et al. ..................... 348/625 |

(Continued)

FOREIGN PATENT DOCUMENTS

| CN | 101166277 A | 4/2008 |
|---|---|---|
| JP | 2006-215918 | 8/2006 |

OTHER PUBLICATIONS

Rainer Leupers, "Compiler Design Issues for Embedded Processors", IEEE Design &Test of Computers, XP011094591, vol. 19, No. 4, Jul. 1, 2002, pp. 51-58.

(Continued)

*Primary Examiner* — Joseph Ustaris
*Assistant Examiner* — Frederick Bailey
(74) *Attorney, Agent, or Firm* — Lempia Summerfield Katz LLC

(57) ABSTRACT

A method for calculating pixel values of interpolated pixel positions located between integer pixel positions in frames of a video picture by a predefined filter operation, the method including: storing the pixel values of the integer pixel position; determining to which of a number of predefined resolution formats the video picture is adapted; defining a fixed width (W) and fixed height value (H) for the frames corresponding to a resolution format determined by the determining; loading a first set of memory addresses for the memory of the video processing apparatus corresponding to a plurality of the pixel values of integer pixel positions; and executing a filter operation on the plurality of the pixel values of integer pixel positions and calculating a plurality of the pixel values of the interpolated pixel positions.

12 Claims, 4 Drawing Sheets

(56) References Cited

U.S. PATENT DOCUMENTS

2006/0193537 A1* 8/2006 Tsumura et al. ............... 382/300
2006/0206729 A1* 9/2006 Hentschel et al. ............. 713/300
2008/0320246 A1* 12/2008 Fuhler et al. .................. 711/154
2009/0173846 A1* 7/2009 Katz ........................... 248/124.1
2009/0257500 A1* 10/2009 Karczewicz et al. .... 375/240.16

OTHER PUBLICATIONS

Thomas Wiegand, et al., "Overview of the H.264/AVC Video Coding Standard", IEEE Transactions on Circuits and Systems for Video Technology, XP011099249, vol. 13, No. 7, Jul. 1, 2003, pp. 560-576.

European Search Report and Supplementary European Search Report dated May 3, 2012, (5 pages).

Combined Chinese Office Action and Search Report Issued Dec. 5, 2012 in Patent Application No. 200980151652.2 (with English translation).

Office Action issued Mar. 11, 2013 in European Patent Application No. 09 833 682.9.

Office Action issued Feb. 13, 2014 in European Patent Application No. 09833682.9.

* cited by examiner

FILTER PROCESS IN COMPRESSION/DECOMPRESSION OF DIGITAL VIDEO SYSTEMS

CROSS REFERENCE TO RELATED APPLICATION

The present application claims the benefit of U.S. provisional application 61/142,287, filed Jan. 2, 2009, the entire content of which is hereby incorporated by reference. The present application claims priority to Norwegian patent application NO20085334, filed Dec. 19, 2008, the entire content of which is hereby incorporated by reference.

TECHNOLOGICAL FIELD

Embodiments described herein relate to video compression/decompression systems, and in particular to an implementation of a filter process in compression/decompression of digital video systems in multi-purpose processors.

BACKGROUND

Transmission of moving pictures in real-time is employed in several applications like, e.g., video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and cannot be transferred over conventional communication networks and transmission lines in real time due to limited bandwidth.

Thus, enabling real time video transmission requires data compression to a large extent. Data compression may, however, compromise with picture quality. Therefore, great efforts have been made to develop compression techniques allowing real time transmission of high quality video over bandwidth limited data connections.

The most common video coding method is described in the MPEG* and H.26* standards, all of which using block based prediction from previously encoded and decoded pictures.

The video data undergoes four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors.

In a typical video sequence, the content of a present block M would be similar to a corresponding block in a previously decoded picture. If no changes have occurred since the previously decoded picture, the content of M would be equal to a block of the same location in the previously decoded picture. In other cases, an object in the picture may have been moved so that the content of M is more equal to a block of a different location in the previously decoded picture. Such movements are represented by motion vectors (V). As an example, a motion vector of (3;4) means that the content of M has moved 3 pixels to the left and 4 pixels upwards since the previously decoded picture.

A motion vector associated with a block is determined by executing a motion search. The search is carried out by consecutively comparing the content of the block with blocks in previous pictures of different spatial offsets. The offset relative to the present block associated with the comparison block having the best match compared with the present block, is determined to be the associated motion vector.

In recent video coding standards, the same concept is extended so that motion vectors also can take ½ pixel values. A vector component of 5.5 then implies that the motion is midway between pixels 5 and 6. More specifically the prediction is obtained by taking the average between the pixel representing a motion of 5 and the pixel representing a motion of 6. This is called a 2-tap filter due to the operation on 2 pixels to obtain prediction of a pixel in between. Motion vectors of this kind are often referred to as having fractional pixel resolution or fractional motion vectors. All filter operations can be defined by an impulse response. The operation of averaging 2 pixels can be expressed with an impulse response of (½, ½). Similarly, averaging over 4 pixels implies an impulse response of (¼, ¼, ¼, ¼).

In H.264/AVC, coding methods have improved both in terms of motion resolution and number of pixels used for each interpolation. The methods use motion compensated prediction with up to ¼ and even ⅛ pixel accuracy. An example of integer- and fractional pixel positions are indicated below (for simplicity, interpolations are only shown between A, E, U and Y):

```
A"   E'   A  b  c  d  E   A'   E"
          f  g  h  i  j
          k  l  m  n  o
          p  q  r  s  t
          U  v  w  x  Y
```

The positions A E U Y indicate integer pixel positions, and A", E', A' and E" indicates additional integer positions on the A-E line. c k m o w indicate half pixel positions. The interpolated values in these positions may be obtained by, e.g., using a 6-tap filter with impulse response (1/32, −5/32, 20/32, 20/32, −5/32, 1/32) operating on integer pixel values. As an example, c is then calculated by the following expression:

$$c = 1/32 \cdot A'' - 5/32 \cdot E' + 20/32 \cdot A + 20/32 \cdot E - 5/32 \cdot A' + 1/32 \cdot E''$$

The filter is operated horizontally or vertically as appropriate.

When a frame of video is encoded into a H.264/AVC bit stream, one of the last steps is usually the half-pixel interpolation filter for preparing for the above-mentioned motion search when coding future frames. This step is one of the most computationally demanding tasks in the encoding process, and involves filtering the entire frame. As the picture resolution increases, this will require a considerable amount of processor capacity and introduces too much delay, especially if the encoding process is implemented on general purpose shared processors, e.g., processors on personal computers.

BRIEF DESCRIPTION OF THE DRAWINGS

In order to make the embodiments described herein more readily understandable, the discussion that follows will refer to the accompanying drawings.

SUMMARY OF THE INVENTION

Figure 1:
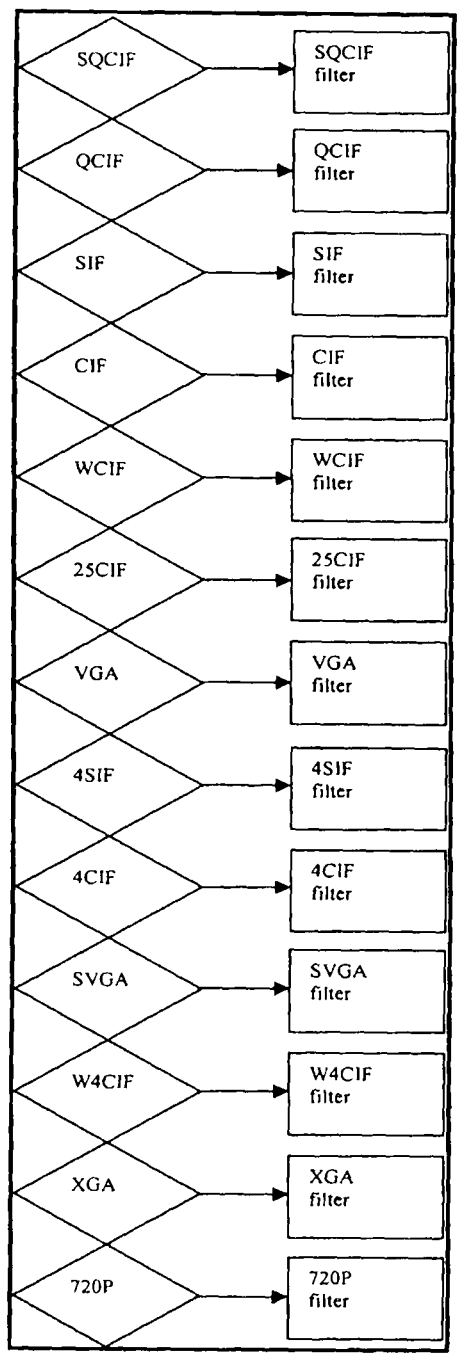
FIG. 1 is a flow chart illustrating an exemplary embodiment of the invention.

A method for calculating pixel values of interpolated pixel positions located between integer pixel positions in frames of a video picture by a predefined filter operation, the method including: storing the pixel values of the integer pixel position in a memory of a video processing apparatus; determining, at the video processing apparatus, to which of a number of predefined resolution formats the video picture is adapted; defining, at the video processing apparatus, a fixed width (W) and fixed height value (H) for the frames corresponding to a resolution format determined by the determining; loading, at the video processing apparatus, a first set of memory addresses for the memory of the video processing apparatus corresponding to a plurality of the pixel values of integer pixel positions, wherein the first set of memory addresses are calculated from, or are referring to, the fixed width (W) and fixed height value (H); and executing, at the video processing apparatus, a filter operation on the plurality of the pixel values of integer pixel positions and calculating a plurality of the pixel values of the interpolated pixel positions by consecutively loading the plurality of the pixel values of integer pixel positions from the memory by using one or more memory addresses from the first set of memory addresses.

Further, the invention may be embodied in a video processing apparatus a computer readable storage medium.

DETAILED DESCRIPTION

In the following, exemplary embodiments will be discussed. However, a person skilled in the art will realize other applications and modifications within the scope of the invention as defined in the enclosed independent claim.

When a frame of video is encoded into a H.264/AVC bit stream, the last two steps are usually the de-blocking filter and the half-pixel interpolation filter. These two steps are together one of the most computationally demanding tasks in the encoding process, and involves filtering the entire frame. In high level software code, the half-pixel interpolation filter is roughly implemented in the following manner:

```
DO I = 1, H
    DO J = 1, W
        X(I,J) = F(Y(I,J))
    ENDDO
ENDDO
```

Here, H denotes the height of a frame, W the width of the frame, Y the unfiltered pixels, X the filtered pixels and F the filter function incorporating the filter taps described in the background section. As can be interpreted from the software code, the loop will start calculating pixels in the upper line of the frame, from left to right, and then consecutively proceeding downwards with the other lines.

For each interpolated pixel value to be calculated, there are a set of corresponding pixels stored in the memory to be multiplied with the filter taps. These pixels are read from the memory, and to do so the memory address is needed.

The function above is adapted to handle all kinds of image resolutions, and H and W are therefore unknown. Thus, the consequence of having a resolution independent implementation, i.e. adjusted to all kinds of resolutions, is that the memory address for the pixel values used in the filter operation must be derived for each pixel calculation.

As resolution increases from VGA (640×440) to 720P (1280×720) and full Aperture 4K (4096×3112), the computational cost of the memory increases dramatically when using the abovementioned loop. For example, full aperture 4K involves the filtering of 12,746,752 pixels, and therefore special care must be taken to cope with data sizes that are larger than the caches in modern processors.

All known algorithms use a single function to filter the pixels, and as already indicated, this means that both H and W given above are unknown, and the addresses that are being loaded and stored from memory are being calculated on the fly. They are not known in compile time (the time during which a software code is compiled, as opposed to run-time, which means the time during which a software code is run), and many additional calculations of memory addresses are required. An address computation prior to each and every load and store may stall the processor pipeline, it may clutter hardware prefetching, it may interfere with instruction layout and instruction cache behavior, and create conflicts on execution ports and/or execution units. So many details can go wrong, although cache effects, like prefetch problems, may be responsible for most of the troubles seen for large data sets like Full Aperture 4K. In pseudo code, the high level software code according to conventional techniques depicted above can be further specified as follows,

```
DO I = 1, H
    DO J = 1, W
        load memory address of Y
        load Y
        X(I,J) = F(Y(I,J))
        load memory address of X
        store X
    ENDDO
ENDDO
```

Note that X and Y may denote vectors and many additional address computations may be required to load and store the pixels needed. For example, it is not unusual to load 16 pixels at a time from the memory, and then to do a parallel calculation of all interpolated pixel values depending on the 16 loaded pixels.

An exemplary embodiment described herein provides a method significantly reducing a number of memory loads/stores and address computations. To achieve known memory behavior within the loop, one filter is implemented for each resolution. Prior to filtering it is determined which format the video content is adapted to. An implementation according to the present invention where, for example, VGA resolution with 640 pixels per line (frame width) and 480 lines (frame height) has been determined could then be as follows,

```
load memory address of X
load memory address of Y
DO I = 1, 480
    DO J = 1, 640
        load Y
        X(I,J) = F(Y(I,J))
        store X
    ENDDO
ENDDO
```

As can be seen, the memory addresses are calculated prior to the filter function. This avoids address calculation for each loop step.

Since the resolution is already known, all memory loads and stores are directly given only by the pixel indexes I and J within the loop, and all the drawbacks involved in calculating memory addresses on the fly can be completely avoided. However, this requires an implementation of a separate filter for each resolution, but as only a limited number of resolutions are supported, the increased size of the executable may be regarded as negligible compared to the size of the frame that is being filtered. Further, additional resolutions can be added as needed.

Hence, according to this exemplary embodiment, the filtering of pixels to calculate interpolated pixel values, e.g. according to H.264, are tailor-made specifically for the resolution at hand.

Exemplary embodiments may provide known memory stride filtering (the filtering of values with known memory addresses). The stride of an array (also increment or step size) refers to the number of locations in memory between successive array elements, measured in bytes or in units of the size of the array's elements. For a given resolution the exact memory location of each pixel in the frame is known in compile-time and does not need to be calculated on the fly. When a memory location is known in compile-time, the memory location is calculated when the code is compiled, and turns out as a constant in run-time. The memory location does not have to be calculated in run-time, which increases memory and processor efficiency. Thus, loading and storing becomes extremely efficient.

This also provides efficient scheduling of instructions. When the locations of the data being used are known in compile time, the compiler is able to schedule the code in the most efficient order. This will in particular boost the in-order execution engines that cannot reorder the instructions in the executable on the fly, but it may also lead to dramatic speedup for out-of-order execution processors that thus may find many more independent instructions that can be executed simultaneously.

Compared with conventional techniques, all other implementations of these filters use the same source code to cover all resolutions. This is very different from the approach available with the exemplary embodiments discussed herein where the source code is adapted to each resolution, thus achieving all the benefits of fixed loop count with known memory stride and efficient instruction scheduling.

FIG. 1 shows exemplary resolutions that may be used with the exemplary embodiments discussed herein, and their correlation a filter for that resolution.

Figure 2A:
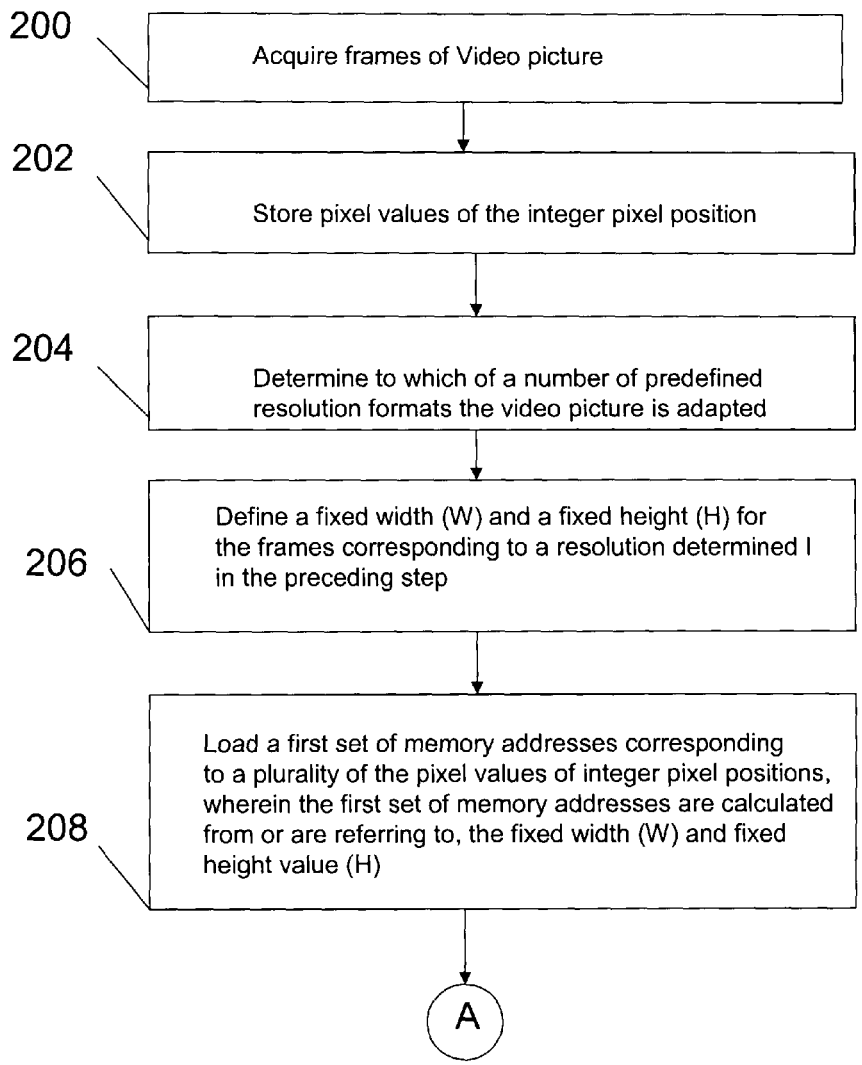
FIGS. 2A and 2B illustrate a flow chart illustrates another exemplary embodiment of the invention.
Figure 2B:
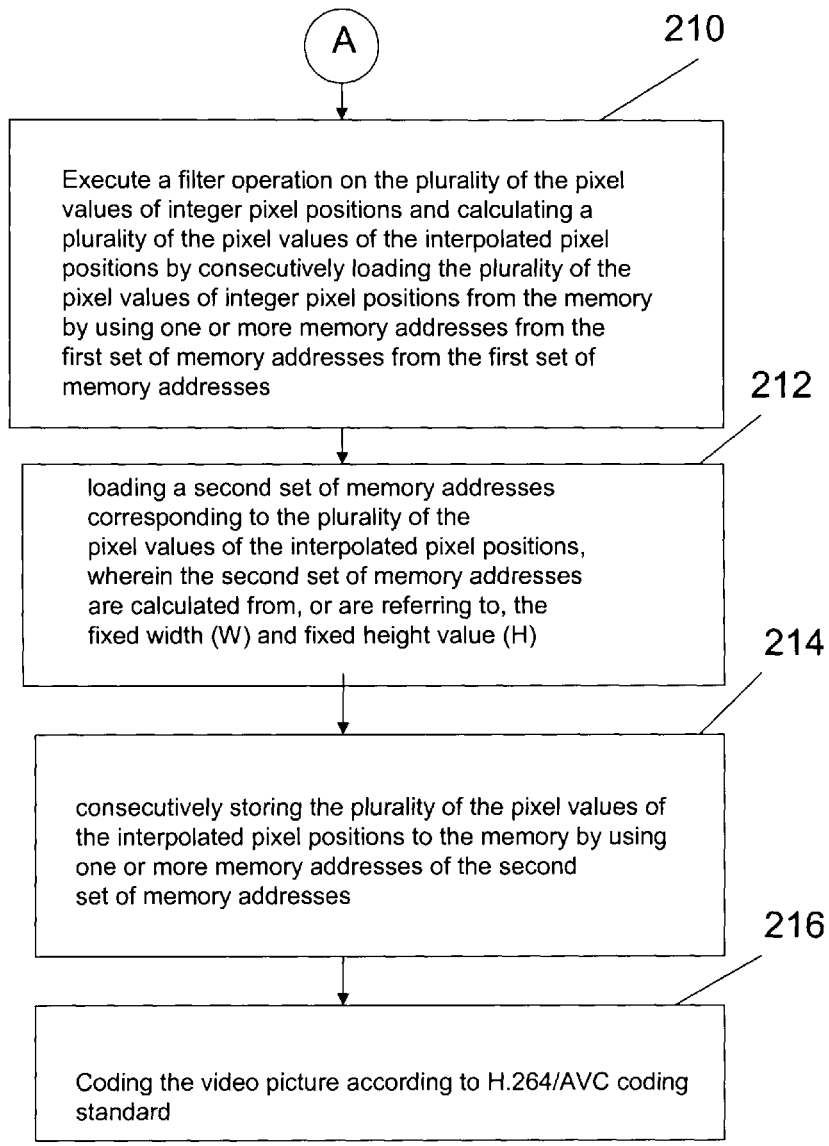

FIGS. 2A and 2B illustrate an exemplary method of calculating pixel values of interpolated pixel positions located between integer pixel positions in frames of a video picture by a predefined filter operation. The steps of this method may be executed by a video processing device (e.g., an encoding apparatus and/or decoding apparatus). In step 200, frames of video picture are acquired. This may be done be receiving a transmission across a network or by accessing the frames of video picture from a memory device. In step 202, the pixel values of the integer pixel position are stored in a memory of a video processing apparatus. The video processing apparatus is discussed below with respect to FIG. 3. In step 204, it is determined as to which of a number of predefined resolution formats the video picture is adapted. Exemplary resolutions are shown in FIG. 1. In step 206, a fixed width (W) and fixed height value (H) for the frames corresponding to a resolution format determined by step 204 are defined. In step 208, a first set of memory addresses for the memory of the video processing apparatus corresponding to a plurality of the pixel values of integer pixel positions are loaded. The first set of memory addresses are calculated from, or are referring to, the fixed width (W) and fixed height value (H). In step 210, a filter operation is executed on the plurality of the pixel values of integer pixel positions and a plurality of the pixel values of the interpolated pixel positions are calculated by consecutively loading the plurality of the pixel values of integer pixel positions from the memory by using one or more memory addresses from the first set of memory addresses. In step 212, a second set of memory addresses for the memory of the video processing device corresponding to the plurality of the pixel values of the interpolated pixel positions are loaded, wherein the second set of memory addresses are calculated from, or are referring to, the fixed width (W) and fixed height value (H). In step 214, the plurality of the pixel values of the interpolated pixel positions are consecutively stored to the memory by using one or more memory addresses of the second set of memory addresses. In step 216, the video picture is coded according to H.264/AVC coding standard. However, other coding standards may also be used.

Further, the executing of step 210 may include multiplying filter taps with respective loaded pixel values of integer pixel positions according to the respective pixel values of the interpolated pixel positions to be calculated.

Figure 3:
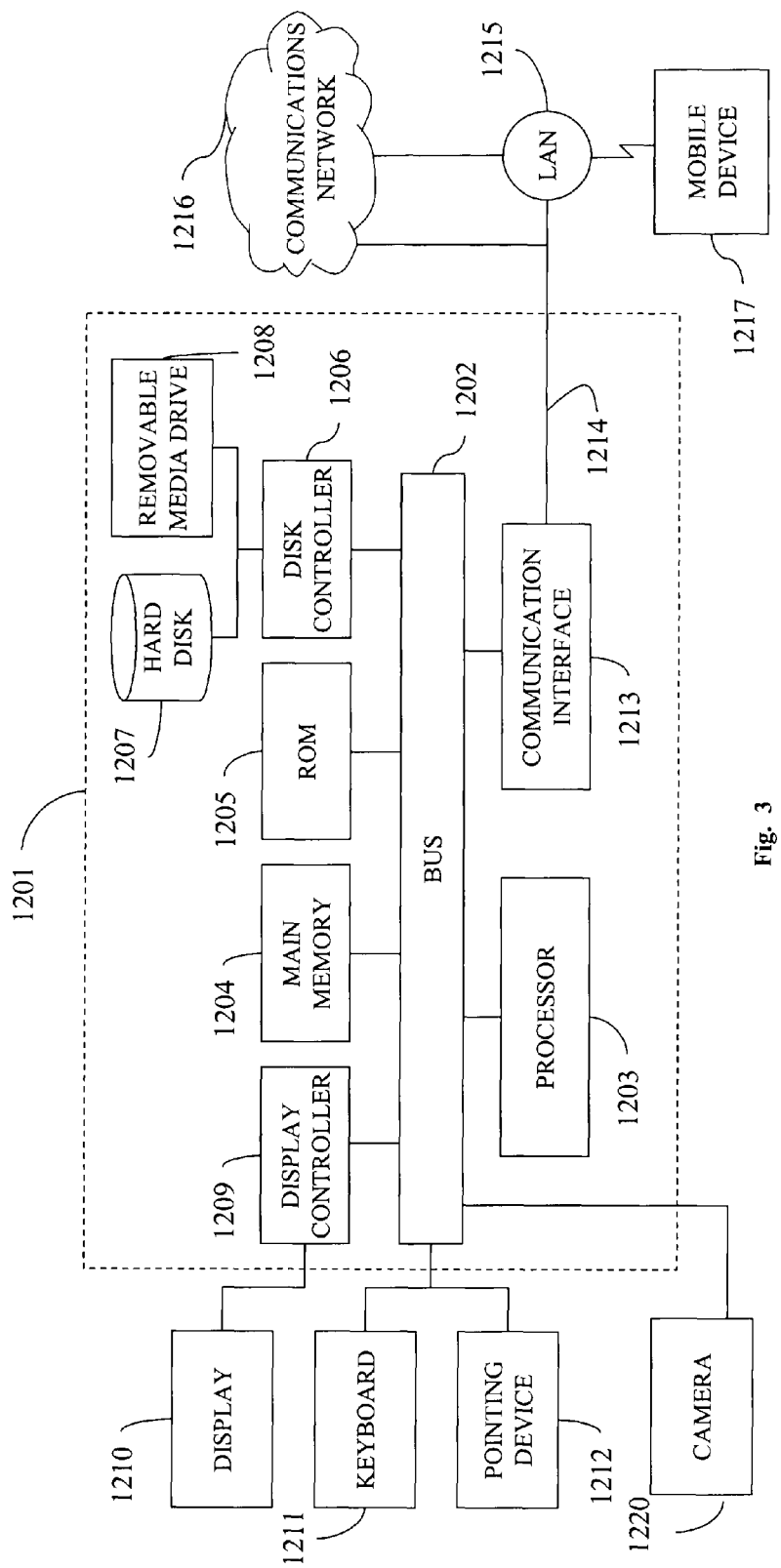
FIG. 3 illustrate an exemplary computer system used to implement an embodiment of the invention.

FIG. 3 illustrates a computer system 1201 (exemplary video processing apparatus) upon which an embodiment of the present invention may be implemented. The computer system 1201 may execute the method of FIGS. 2A and 2B. The computer system 1201 may be embodied in a variety of equipment, including a video conference endpoint, an MCU, or a mobile device. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the exemplary embodiments of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multiprocessing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, or any other medium from which a computer can read. Other embodiments include instructions encoded into a signal or carrier wave.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, and volatile media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The invention claimed is:

1. A method for calculating pixel values of interpolated pixel positions located between integer pixel positions in frames of a video picture by a predefined filter operation, the method comprising:
   storing a plurality of the pixel values of the integer pixel position in a memory of a video processing apparatus;
   determining, at the video processing apparatus, to which of a number of predefined resolution format standards the video picture is adapted;
   defining, at the video processing apparatus after the determining, a fixed width (W) and fixed height value (H) for the frames corresponding to a resolution format standard determined by the determining;
   loading, at the video processing apparatus in compile-time, all memory addresses of every integer pixel position in a frame of the video picture, wherein the memory addresses are calculated from, or are referring to, the fixed width (W) and fixed height value (H) defined in the defining;
   selecting the predefined filter operation, from a plurality of predefined filter operations, corresponding to the resolution format standard of the frame of the video picture that includes the plurality of pixel values of the integer pixel positions; and
   executing, after the loading of the memory addresses of every integer pixel position in the frame of the video picture, at the video processing apparatus, the predefined filter operation on the plurality of the pixel values of integer pixel positions and calculating a plurality of the pixel values of the interpolated pixel positions by consecutively loading each of the plurality of the pixel values of integer pixel positions from the memory by using one or more memory addresses obtained in the loading.

2. The method according to claim 1, further comprising:
   loading a second set of memory addresses for the memory of the video processing device corresponding to the plurality of the pixel values of the interpolated pixel positions, wherein the second set of memory addresses are calculated from, or are referring to, the fixed width (W) and fixed height value (H); and
   consecutively storing the plurality of the pixel values of the interpolated pixel positions to the memory by using one or more memory addresses of the second set of memory addresses.

3. The method according to claim 1,
   wherein the executing the predefined filter operation further includes multiplying filter taps with respective loaded pixel values of integer pixel positions according to the respective pixel values of the interpolated pixel positions to be calculated.

4. The method according to claim 2, wherein the executing the predefined filter operation further includes multiplying filter taps with respective loaded pixel values of integer pixel positions according to the respective pixel values of the interpolated pixel positions to be calculated.

5. The method according to claim 1, wherein the predefined filter operation corresponds to a 6-tap filter with filter coefficients ($1/32$, $-5/32$, $20/32$, $20/32$, $-5/32$, $1/32$), and the interpolated pixel positions are $1/2$ pixel positions.

6. The method according to claim 1, wherein the predefined resolution format standards include SQCIF, QCIF, CIF, SIF, WCIF, 25CIF, VGA, 4CIF, 4SIF, SVGA, W4CIF, XGA, 720P, 1080P, Quad 1080P, and full Aperture 4K.

7. The method of claim 1, further comprising:
   coding the video picture according to H.264/AVC coding standard.

8. A non-transitory computer readable storage medium encoded with instructions, which when executed by a video processing apparatus causes the video processing apparatus to execute a method for calculating pixel values of interpolated pixel positions located between integer pixel positions in frames of a video picture by a predefined filter operation, the method comprising:
   storing a plurality of the pixel values of the integer pixel positions in a memory of a video processing apparatus;
   determining, at the video processing apparatus, to which of a number of predefined resolution format standards the video picture is adapted;
   defining, at the video processing apparatus after the determining, a fixed width (W) and fixed height value (H) for the frames corresponding to a resolution format standard determined by the determining;
   loading, at the video processing apparatus in compile-time, all memory addresses of every integer pixel position in a frame of the video picture, wherein the memory addresses are calculated from, or are referring to, the fixed width (W) and fixed height value (H) defined in the defining;
   selecting the predefined filter operation, from a plurality of predefined filter operations, corresponding to the resolution format standard of the frame of the video picture that includes the plurality of pixel values of the integer pixel positions; and
   executing, after the loading of the memory address of every integer pixel position in the frame of the video picture, at the video processing apparatus, the predefined filter operation on the plurality of the pixel values of integer pixel positions and calculating a plurality of the pixel values of the interpolated pixel positions by consecutively loading each of the plurality of the pixel values of integer pixel positions from the memory by using one or more memory addresses obtained in the loading.

9. An apparatus which calculates pixel values of interpolated pixel positions located between integer pixel positions in frames of a video picture by a predefined filter operation, the apparatus comprising:
   means for storing a plurality of the pixel values of the integer pixel position;
   means for determining to which of a number of predefined resolution format standards the video picture is adapted;
   means for defining at the video processing apparatus, a fixed width (W) and fixed height value (H) for the frames corresponding to a resolution format standard after the resolution format standard is determined;
   means for loading, in compile-time, all memory addresses of every integer pixel position in a frame of the video picture, wherein the memory addresses are calculated from, or are referring to, the fixed width (W) and fixed height value (H) defined;
   means for selecting the predefined filter operation, from a plurality of predefined filter operations, that corresponds to the resolution format standard of the frame of the video picture that includes the plurality of pixel values of the integer pixel positions; and
   means for executing, after the loading of the memory addresses of every integer pixel position in the frame of the video picture, the predefined filter operation on the plurality of the pixel values of integer pixel positions and calculating a plurality of the pixel values of the interpolated pixel positions by consecutively loading each of the plurality of the pixel values of integer pixel positions from the memory by using one or more memory addresses obtained by the means for loading.

10. The method according to claim 1, wherein the selecting includes selecting the predefined filter operation that is uniquely configured for the resolution format standard of the frame of the video picture that includes the plurality of the pixel values of the integer pixel positions.

11. The non-transitory computer readable storage medium according to claim 8, wherein the selecting includes selecting the predefined filter operation that is uniquely configured for the resolution format standard of the frame of the video picture that includes the plurality of the pixel values of the integer pixel positions.

12. The apparatus according to claim 9, wherein the means for selecting selects the predefined filter operation that is uniquely configured for the resolution format standard of the frame of the video picture that includes the plurality of the pixel values of the integer pixel positions.

* * * * *